United States Patent
Atkinson et al.

(10) Patent No.: US 9,102,363 B2
(45) Date of Patent: Aug. 11, 2015

(54) DYNAMIC VEHICLE MUDGUARDS

(71) Applicant: Toyota Motor Engineering & Manufacturing North America, Inc., Erlanger, KY (US)

(72) Inventors: Aaron W. J. Atkinson, Glendale, AZ (US); Kevin Nevaux, Peoria, AZ (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 26 days.

(21) Appl. No.: 13/938,574

(22) Filed: Jul. 10, 2013

(65) Prior Publication Data

US 2015/0014976 A1   Jan. 15, 2015

(51) Int. Cl.
*B62D 25/16*   (2006.01)
*B62D 25/18*   (2006.01)

(52) U.S. Cl.
CPC .................................. *B62D 25/182* (2013.01)

(58) Field of Classification Search
CPC ...... B62D 25/16; B62D 25/18; B62D 25/182; B62D 25/188; B62D 25/168
USPC ........... 280/762, 768, 770, 847, 152.1, 152.2, 280/152.3, 848, 849, 850, 851, 852, 159
See application file for complete search history.

(56) References Cited

U.S. PATENT DOCUMENTS

| | | | |
|---|---|---|---|
| 558,377 A * | 4/1896 | Fox | 280/152.3 |
| 1,754,147 A * | 4/1930 | Cookson | 280/851 |
| 1,965,756 A | 7/1934 | Wondra | |
| 2,000,220 A * | 5/1935 | Cohen | 280/851 |
| 2,217,046 A * | 10/1940 | Fergueson | 292/86 |
| 2,460,349 A * | 2/1949 | Hessler | 280/848 |
| 2,591,196 A * | 4/1952 | Post | 40/211 |
| 2,605,119 A * | 7/1952 | Earnest | 280/849 |
| 2,809,848 A * | 10/1957 | Carswell | 280/851 |
| 2,826,428 A * | 3/1958 | Lincoln | 280/851 |
| 3,088,751 A * | 5/1963 | Barry et al. | 280/851 |
| 3,089,712 A * | 5/1963 | Kosik, Jr. | 280/851 |
| 3,091,478 A * | 5/1963 | Ambli | 280/851 |
| 3,129,956 A * | 4/1964 | Eaves | 280/851 |
| 3,195,920 A * | 7/1965 | Knisely et al. | 280/851 |
| 3,726,544 A * | 4/1973 | Miller | 280/851 |
| 3,799,580 A * | 3/1974 | McGuire | 280/851 |

(Continued)

FOREIGN PATENT DOCUMENTS

| CN | 202827883 | 3/2013 |
|---|---|---|
| GN | GB190722616 | 6/1908 |

OTHER PUBLICATIONS

"Folding mudguards that work better than you may have imagined." http://longoncyclist.co.uk/folding-mudguards, accessed Apr. 22, 2013.

*Primary Examiner* — Brodie Follman
(74) *Attorney, Agent, or Firm* — Dinsmore & Shohl LLP (57) ABSTRACT

Dynamic vehicle mudguards are provided. A dynamic vehicle mudguard for attachment to a vehicle includes a first portion, a second portion, and a hinge portion. The hinge portion is coupled to the first portion, and the second portion is coupled to the hinge portion and separated from the first portion. When the dynamic vehicle mudguard is installed on the vehicle, the second portion is pivotable relative to the first portion about a pivot axis from a default position to an aerodynamic position, wherein the pivot axis extends vertically.

16 Claims, 8 Drawing Sheets

(56) References Cited

U.S. PATENT DOCUMENTS

| | | | |
|---|---|---|---|
| 3,802,739 A | | 4/1974 | Knyszel et al. |
| 4,099,736 A | * | 7/1978 | Shiina ............................ 280/851 |
| 4,103,918 A | * | 8/1978 | Salden .......................... 280/851 |
| 4,357,030 A | * | 11/1982 | Verge ............................ 280/851 |
| 4,362,310 A | | 12/1982 | Goodall |
| 4,421,333 A | * | 12/1983 | Van Dyke ..................... 280/851 |
| 4,572,532 A | * | 2/1986 | Early et al. .................... 280/851 |
| 4,928,994 A | * | 5/1990 | Buchner ........................ 280/851 |
| 5,509,690 A | * | 4/1996 | Whittington .................. 280/851 |
| 6,203,066 B1 | * | 3/2001 | Lewis ........................... 280/851 |
| 7,810,828 B2 | | 10/2010 | Sugiyama et al. |
| 8,465,058 B1 | * | 6/2013 | Herrera ........................ 280/847 |
| 8,651,528 B2 | * | 2/2014 | Earl et al. ..................... 280/851 |
| 8,864,176 B2 | * | 10/2014 | Lasser .......................... 280/851 |
| 2002/0056985 A1 | * | 5/2002 | Szakurski .................... 280/848 |
| 2002/0109347 A1 | | 8/2002 | Sheppard |
| 2003/0184078 A1 | * | 10/2003 | Grable ......................... 280/847 |
| 2012/0068448 A1 | | 3/2012 | Lasser |

\* cited by examiner

DYNAMIC VEHICLE MUDGUARDS

TECHNICAL FIELD

The present specification generally relates to vehicle mudguards and, more specifically, to dynamic vehicle mudguards that may reduce aerodynamic drag.

BACKGROUND

Vehicle mudguards may prevent mud, dirt, gravel, and other debris from being propelled from a vehicle tire into the body of the vehicle, or into the air around the vehicle tire when the vehicle tire rotates as the vehicle moves forward. Such debris may cause damage to the vehicle or objects behind the vehicle. However, vehicle mudguards may increase the aerodynamic drag on the vehicle, which may result in reduced fuel economy or reduced emissions performance.

Accordingly, a need exists for aerodynamic vehicle mudguards.

SUMMARY

In one embodiment, a dynamic vehicle mudguard for attachment to a vehicle includes a first portion, a second portion, and a hinge portion. The hinge portion is coupled to the first portion, and the second portion is coupled to the hinge portion and separated from the first portion. When the dynamic vehicle mudguard is installed on the vehicle, the second portion is pivotable relative to the first portion about a pivot axis from a default position to an aerodynamic position, wherein the pivot axis extends vertically.

In another embodiment, a vehicle includes a dynamic vehicle mudguard. The dynamic vehicle mudguard includes a first portion, a second portion, a hinge portion, and a spring, wherein the hinge portion is coupled to the first portion, the second portion is coupled to the hinge portion and separated from the first portion, and the second portion is pivotable with respect to the first portion from a default position to an aerodynamic position around a pivot axis. The pivot axis extends vertically and the dynamic vehicle mudguard is attached to the vehicle such that the dynamic vehicle mudguard is positioned adjacent to a vehicle wheel, and the spring biases the second portion to the default position.

In yet another embodiment, a vehicle includes a dynamic vehicle mudguard, the dynamic vehicle mudguard comprising a first portion, a second portion, and a hinge portion. The hinge portion is coupled to the first portion, the second portion is coupled to the hinge portion and separated from the first portion, and the second portion is pivotable relative to the first portion about a pivot axis from a default position to an aerodynamic position. The first portion is fixed relative to the vehicle in the default position and in the aerodynamic position.

In another embodiment, a method of actively controlling a dynamic vehicle mudguard attached to a vehicle includes monitoring a vehicle condition of the vehicle and determining whether the vehicle condition exceeds a predetermined threshold. The method further includes transitioning the dynamic vehicle mudguard from a default position to an aerodynamic position based on the vehicle condition, and transitioning the dynamic vehicle mudguard from the aerodynamic position to the default position when the vehicle condition is below the predetermined threshold.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein relate to dynamic vehicle mudguards that may reduce aerodynamic drag on vehicles by being reconfigurable from a default position to an aerodynamic position. Referring generally to the figures, dynamic vehicle mudguards, as described herein, may include a first portion, a second portion, and a hinge portion. Some embodiments may further include a biasing member that biases the second portion of the dynamic vehicle mudguard to the default position. Either one, or both, of the first and second portions may be pivotable or otherwise movable with respect to the other. The first and/or second portions may pivot or move around a pivot axis, which may be horizontal or vertical. In the default position, the first and second portions are substantially coplanar and have a frontal area that may be exposed to airflow when the vehicle is in motion, causing aerodynamic drag on the vehicle. When the vehicle is in motion, the dynamic vehicle mudguard may no longer be needed to prevent mud, gravel, and other debris from impacting the vehicle or being projected into the air around the vehicle wheels. Accordingly, the dynamic vehicle mudguard may shift from the default position to the aerodynamic position, in which a frontal area of the dynamic vehicle mudguard exposed to freestream airflow is reduced. The dynamic vehicle mudguard may shift from the default position to the aerodynamic position based on the force applied to the frontal area of the dynamic vehicle mudguard by airflow, or based on vehicle speed, for example. Reduced frontal area reduces the amount of exposure to freestream airflow when the vehicle is in motion, and may therefore reduce the overall aerodynamic drag on the vehicle. The dynamic vehicle mudguards discussed herein may be formed as a single piece, or as multiple pieces, and may have various material properties and hinging assemblies. While these embodiments may be considered passive dynamic vehicle mudguards, in other embodiments the dynamic vehicle mudguards may be operated under active control or by other mechanical and/or actuation systems. The various dynamic vehicle mudguards and related systems will be described in more detail herein with specific reference to the corresponding drawings.

Coordinate axes are included in some of the drawings in order to provide a frame of reference for various components of the dynamic vehicle mudguards. As used herein, "vertical" is defined as the positive/negative y directions of the coordinate axes shown in the drawings. "Horizontal" is defined as the positive/negative x direction of the coordinate axes shown in the drawings. "Front view" is defined as the view from the negative z direction towards the positive z direction of the coordinate axes shown in the drawings. "Rear view" is defined as the view from the positive z direction towards the negative z direction of the coordinate axes shown in the drawings.

Figure 1:
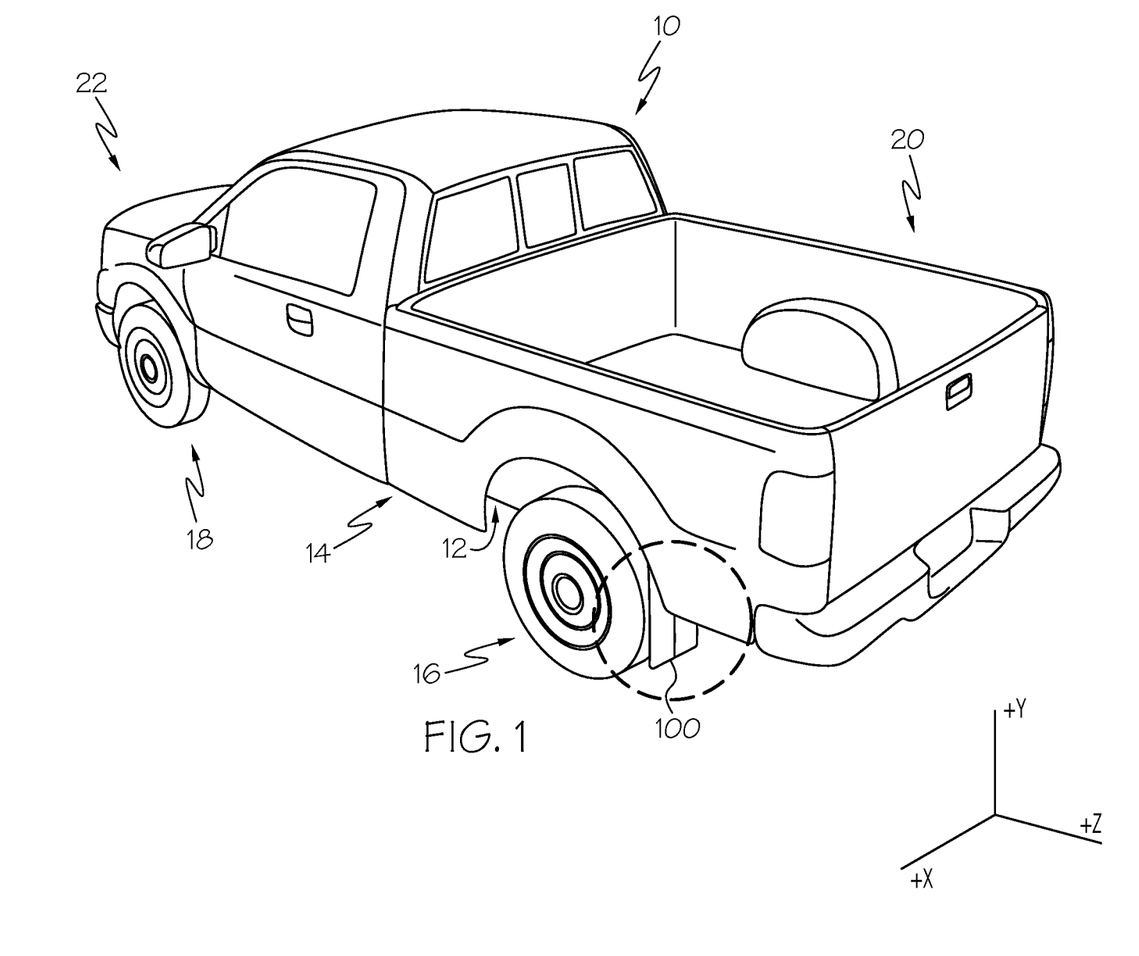
FIG. 1 schematically depicts a vehicle having a dynamic vehicle mudguard, according to one or more embodiments shown and described herein.

Referring now to FIG. 1, a vehicle 10 includes a passive dynamic vehicle mudguard 100 mounted to the vehicle 10. The dynamic vehicle mudguard 100 may be mounted to a wheel well 12 or a quarter panel 14 of the vehicle 10, or may be mounted to another portion of the vehicle 10. The dynamic vehicle mudguard 100 may be mounted to the vehicle 10 via any attachment means, including screws, clips, nuts and bolts, adhesives, pins, or other attachment means. Additionally, while the vehicle 10 is depicted in FIG. 1 as having one dynamic vehicle mudguard 100 mounted near rear wheel 16, positioned at a rear section 20 of the vehicle 10, the vehicle 10 may have additional dynamic vehicle mudguards 100 mounted near some or all of the vehicle wheels, including near front wheel 18 positioned at a front section 22 of the vehicle 10.

Figure 2:
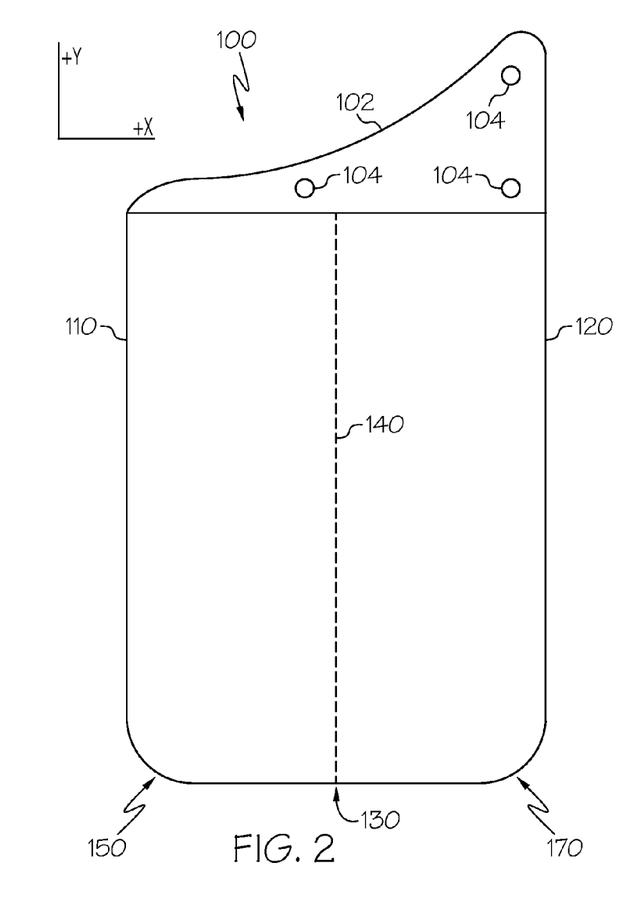
FIG. 2 schematically depicts a front view of the dynamic vehicle mudguard of FIG. 1 in a default position, according to one or more embodiments shown and described herein.

Referring now to FIG. 2, one embodiment of the dynamic vehicle mudguard 100 of FIG. 1 is schematically depicted in detail from a front view. In FIG. 2, the front view of the dynamic vehicle mudguard 100 is the dynamic vehicle mudguard 100 as it appears in front view, when viewing the dynamic vehicle mudguard 100 from the front section 22 of the vehicle 10. In this embodiment, the dynamic vehicle mudguard 100 includes an attachment portion 102, a first portion 110, a second portion 120, a hinge portion 130, and a pivot axis 140.

The attachment portion 102 facilitates attaching the dynamic vehicle mudguard 100 to the vehicle 10. The attachment portion 102 may include openings or perforations 104 that allow for the dynamic vehicle mudguard 100 to be attached or mounted on the vehicle 10 using, for example, screws, bolts, or clips. In some embodiments, the attachment portion 102 may be rigidly fixed to the vehicle 10, and in other embodiments, the attachment portion 102 may be only partially fixed to the vehicle 10. Further, although shown in FIG. 2 as a triangular shape, the attachment portion 102 may have various geometries and dimensions, including for example rectangular, elliptical, and combinations of different geometries. As the dynamic vehicle mudguard 100 may be mounted on the vehicle 10 after the vehicle is assembled, some embodiments of the dynamic vehicle mudguard 100 may include threaded openings that align with similar threaded openings on the vehicle 10 that allow the dynamic vehicle mudguard 100 to be mounted to the vehicle 10. The attachment portion 102 may be formed from a variety of materials, including rubber, aluminum, steel, plastic, and other materials or combinations of materials.

The dynamic vehicle mudguard 100 also includes the first portion 110. In this embodiment, the first portion 110 is positioned on an inner side of the dynamic vehicle mudguard 100, towards an undercarriage of the vehicle 10, while in other embodiments (not shown) the first portion 110 may be positioned on an outer side of the vehicle 10. The first portion 110 may be formed from the same material as the attachment portion 102, or may be formed from a different material, including materials such as rubber and plastic. Further, the first portion 110 may be separate from the attachment portion 102 or may be an extension of the attachment portion 102. The first portion 110 may also be connected to the attachment portion 102, as will be discussed herein.

The second portion 120, depicted in FIG. 2 on an outer side of the vehicle 10, may also be positioned on an inner side of the vehicle 10 in other embodiments. Similar to the first portion 110, the second portion 120 may be connected to or separate from the attachment portion 102 and/or the first portion 110. In some embodiments, the second portion 120 may be made from the same material as the first portion 110 and/or attachment portion 102. In other embodiments, the second portion 120 may be made from a different material than the first portion 110 and the attachment portion 102. Further, the second portion 120 may have the same dimensions and geometry as the first portion 110, while in other embodiments, the second portion 120 may have different dimensions and/or a different geometry than the first portion 110 and/or the attachment portion 102.

The dynamic vehicle mudguard 100 further includes the hinge portion 130 and the pivot axis 140. The hinge portion 130 separates the first portion 110 from the second portion 120, and may be constructed from the same material as either or both the first portion 110 and the second portion 120. The hinge portion 130 may also separate the first portion 110 and the second portion 120 in some embodiments. The pivot axis 140 is depicted along the vertical axis of the dynamic vehicle mudguard 100 in FIG. 2, which is also along the vertical axis of the vehicle 10 in FIG. 1. In other embodiments, the pivot axis 140 may be along the horizontal axis of the dynamic vehicle mudguard 100 (or the horizontal axis of the vehicle 10), or at any angle of the dynamic vehicle mudguard 100, as discussed further below. Further, the dynamic vehicle mudguard 100 may include more than one pivot axis 140, creating multiple pivotable portions. The pivot axis 140 is the axis around which the first portion 110 can pivot with respect to the second portion 120, and/or the second portion 120 can pivot with respect to the first portion 110. In some embodiments, both the first and second portions 110, 120 may be pivotable around the pivot axis 140, while in other embodiments only one portion may be pivotable with respect to the other. In embodiments where only one of the two portions is pivotable, or in cases with more than two pivotable portions, one portion of the dynamic vehicle mudguard may be fixed relative to the vehicle 10, such that the fixed portion is not pivotable or movable with respect to the vehicle 10 or any of the other portions.

Still referring to FIG. 2, the first portion 110 and the second portion 120 combine to form a default frontal area 150, which is the total surface area of the first portion 110 and the second portion 120 combined that is exposed to freestream airflow when the vehicle 10 is in motion. Air flowing against the default frontal area 150, for example when the vehicle 10 is in motion, is referred to as freestream airflow herein. Freestream airflow may cause an aerodynamic drag on the vehicle 10 by impinging against the default frontal area 150. The aerodynamic drag may negatively impact fuel economy and/or emissions performance.

Figure 3:
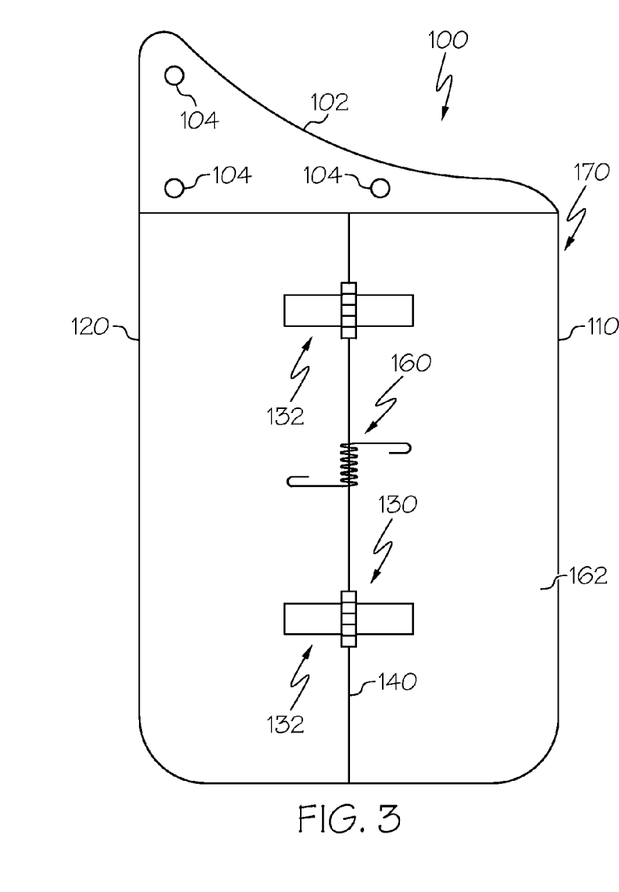
FIG. 3 schematically depicts a rear view of the dynamic vehicle mudguard of FIG. 1, according to one or more embodiments shown and described herein.

Referring now to FIG. 3, the dynamic vehicle mudguard 100 is shown in rear view, or as dynamic vehicle mudguard 100 appears when viewing from the rear section 20 of the vehicle 10. In this embodiment, the hinge portion 130 includes hinges 132. The hinges 132 allow the second portion 120 to pivot around the pivot axis 140 or the first portion 110 to pivot around the pivot axis 140. The hinges 132 may engage both the first portion 110 and the second portion 120. The hinge portion 130 may also bias the second portion to the default position 170 in some embodiments. While the hinge portion 130 is depicted as including hinges 132 in this embodiment, in other embodiments the hinge portion 130 may include pins, clips, or other mechanical hinges.

Still referring to FIG. 3, the dynamic vehicle mudguard 100 further includes a biasing member 160 positioned on a rear surface 162 in this embodiment of the dynamic vehicle mudguard 100. While the biasing member 160 is depicted as a single spring in this embodiment, other embodiments may include more or fewer springs. Also, while the biasing member 160 in this embodiment is depicted as a spring, it is contemplated that the biasing member 160 may have other forms, as discussed further herein. The biasing member 160 biases at least one of the first portion 110 and the second portion 120 of the dynamic vehicle mudguard 100 to the default position 170. In the default position 170, the first and second portions 110, 120 are substantially coplanar with each other. The default position 170 allows the dynamic vehicle mudguard 100 to act as a protective device that prevents mud, debris, gravel, and other projectiles from ejecting from an adjacent wheel of the vehicle 10 and contacting the vehicle body or otherwise projecting or propelling off the vehicle wheels. The biasing member 160 may passively allow either or both the first and second portions 110, 120 of the dynamic vehicle mudguard 100 to pivot around the pivot axis 140 when a force is applied to the default frontal area 150 of the dynamic vehicle mudguard 100, or when the dynamic vehicle mudguard 100 is actuated in active control embodiments, as will be discussed further herein. When there is no force or less than a predetermined amount of force applied to the default frontal area 150 of the dynamic vehicle mudguard 100, the biasing member 160 may bias the first and/or second portions 110, 120 to the default position 170.

Figure 4:
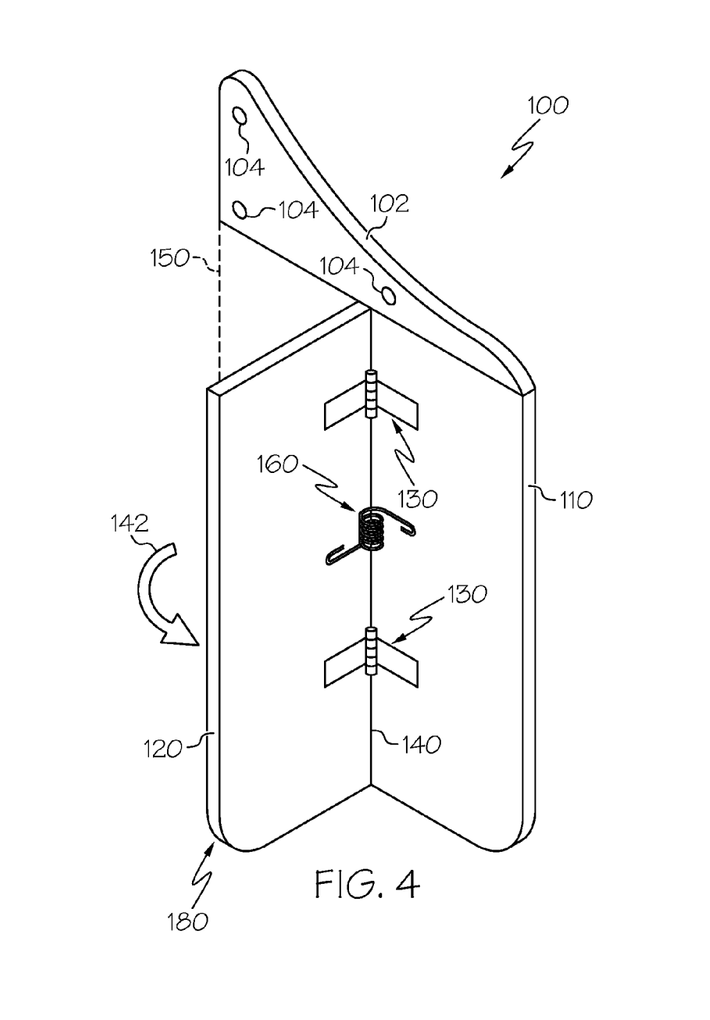
FIG. 4 schematically depicts a rear view of the dynamic vehicle mudguard of FIG. 1 moving from the default position to an aerodynamic position, according to one or more embodiments shown and described herein.

Referring now to FIG. 4, the second portion 120 is depicted moving around the pivot axis 140 in direction 142 from the default position 170 to an aerodynamic position 180. The aerodynamic position 180 may be any position such that the default frontal area 150 is reduced. In some embodiments the aerodynamic position 180 may be when the first portion 110 and the second portion 120 are not coplanar with each other. In other embodiments, the aerodynamic position 180 may be the position in which the second portion 120 is positioned such that the entire second portion 120 is behind the first portion 110. In still other embodiments, the aerodynamic position 180 may involve rotation of one of or both the first portion 110 and the second portion 120 around the pivot axis 140, and in additional embodiments the aerodynamic position may be achieved by sliding either the first or second portion 110, 120 with respect to the other portion.

The dynamic vehicle mudguard 100 may passively move from the default position 170 to the aerodynamic position 180 based on force applied to the default frontal area 150 of the dynamic vehicle mudguard 100. The biasing member 160 may resist the change from the default position 170 to the aerodynamic position 180 by biasing one or both the first and second portions 110, 120 to the default position 170. The biasing member 160 may also be configured such that the biasing member 160 allows the dynamic vehicle mudguard 100 to change from the default position 170 to the aerodynamic position 180 as the default frontal area 150 is exposed to a certain amount of force. For example, in embodiments including the biasing member 160, the amount of force required to overcome the biasing member 160 may be based on the force applied to the default frontal area 150 at a specific vehicle speed. In this manner, the dynamic vehicle mudguard 100 may pivot from the default position 170 to the aerodynamic position 180 when the default frontal area 150 is exposed to a force equivalent to or greater than the force the default frontal area 150 would be exposed to when the vehicle is traveling above a predetermined threshold speed, for example. In embodiments with active control devices, actuation of the dynamic vehicle mudguard 100 from the default position 170 to the aerodynamic position 180 may be configured based on vehicle speed inputs, pressure sensor readings, force sensor readings, or other parameters, as discussed further herein. In embodiments without the biasing member 160, the hinge portion 130 may include mechanical properties that manage movement from the default position 170 to the aerodynamic position 180, as will be discussed herein.

Figure 5:
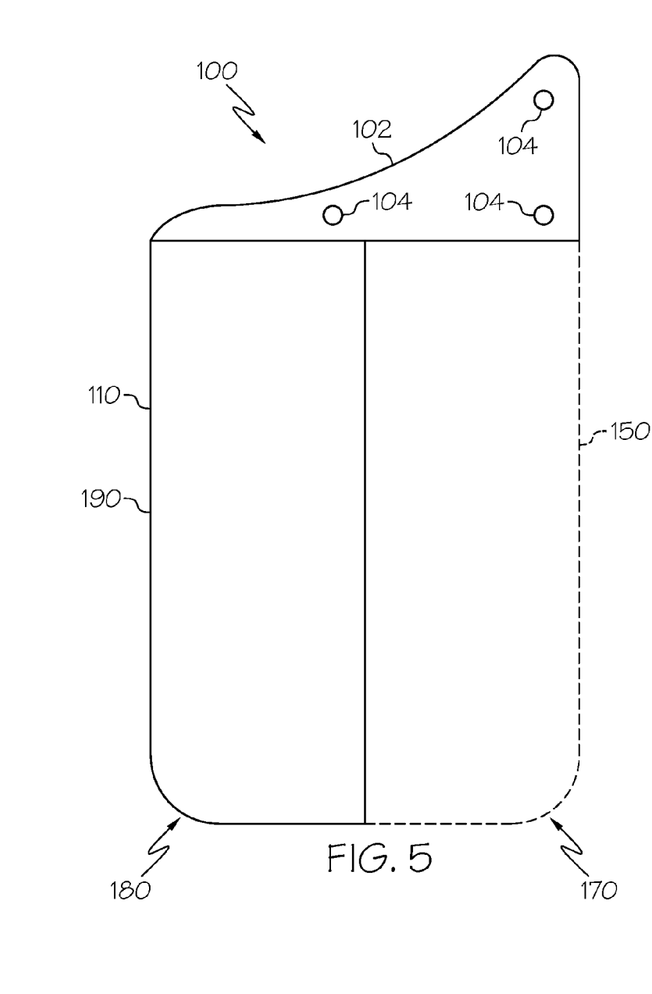
FIG. 5 schematically depicts a front view of the dynamic vehicle mudguard of FIG. 1 in the aerodynamic position, according to one or more embodiments shown and described herein.

Referring now to FIG. 5, the dynamic vehicle mudguard 100 is shown in front view in the aerodynamic position 180. As depicted, an aerodynamic frontal area 190 in the aerodynamic position 180 is less than the default frontal area 150 in the default position 170. By reducing the frontal area, aerodynamic drag on the dynamic vehicle mudguard 100, and therefore on the vehicle 10, is reduced. The reduced aerodynamic drag may result in increased fuel economy and reduced wear and tear on the dynamic vehicle mudguard 100.

Figure 6:
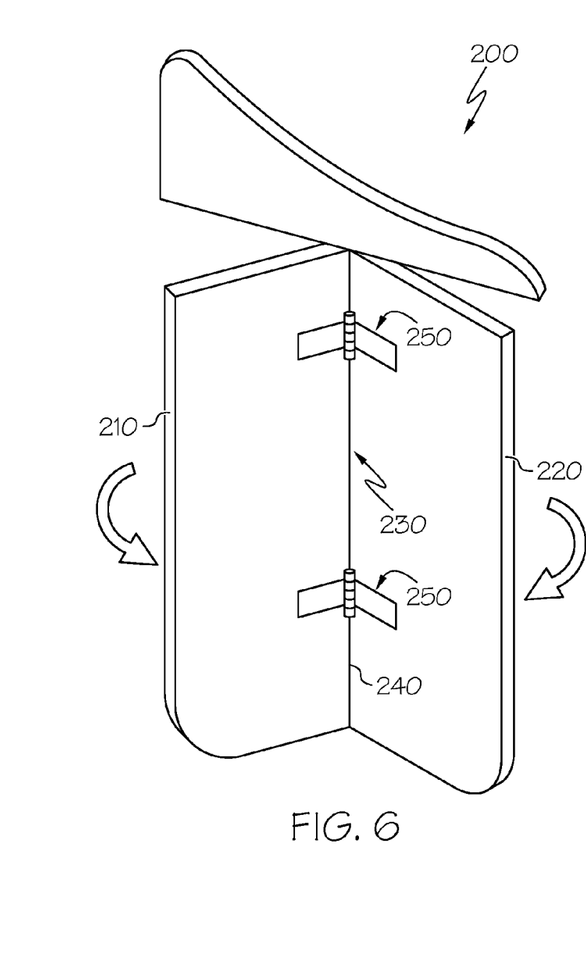
FIG. 6 schematically depicts a rear view of a dynamic vehicle mudguard, according to one or more embodiments shown and described herein.

Referring now to FIG. 6, another embodiment of a passive dynamic vehicle mudguard 200 is depicted in rear view. In this embodiment, the dynamic vehicle mudguard 200 includes a first portion 210, a second portion 220, a hinge portion 230 with hinges 250, and a pivot axis 240. In this embodiment, both the first and second portions 210, 220 are pivotable around the pivot axis 240. The pivot axis 240 is along the vertical axis. In this embodiment, the default position is the same as the default position discussed above, such that the first and second portions 210, 220 are substantially coplanar. However, in this embodiment, the aerodynamic position may be reached when both the first and second portions 210, 220 move from the default position. This may further reduce the frontal area of the dynamic vehicle mudguard 200, as the first and second portions 210, 220 are angled away from the default position. This embodiment may reduce or mitigate a substantial amount of aerodynamic drag associated with the dynamic vehicle mudguard 200. When force applied to the frontal area of the dynamic vehicle mudguard 200 is below a predetermined level, or when actuated in an active control embodiment, the first and second portions 210, 220 may return to the default position. As discussed, the hinge portion 230 may include additional or fewer hinges, or other types of hinges.

Figure 7:
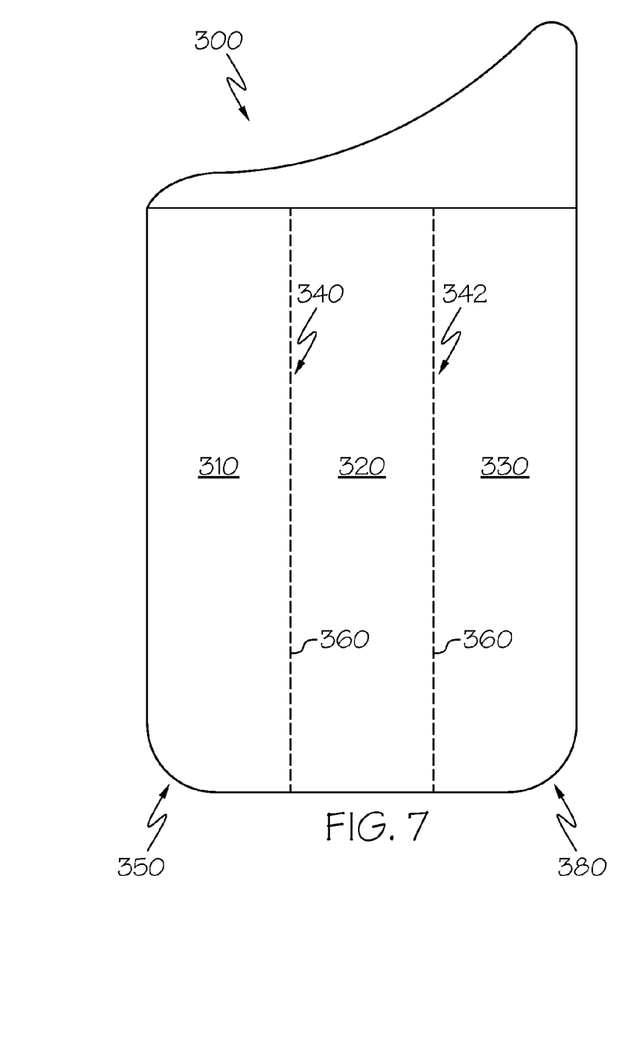
FIG. 7 schematically depicts a front view of a dynamic vehicle mudguard with multiple pivot axes, according to one or more embodiments shown and described herein.

Referring now to FIG. 7, another embodiment of a passive dynamic vehicle mudguard 300 is depicted. This embodiment includes a first portion 310, a second portion 320, a third portion 330, a first hinge portion 340, and a second hinge portion 342. The first portion 310 and the second portion 320 are each coupled to and separated by the first hinge portion 340, while the second portion 320 and the third portion 330 are each coupled to and separated by the second hinge portion 342. This embodiment has a default position 350 in which each of the first, second, and third portions 310, 320, 330 are substantially coplanar. In an aerodynamic position, however, the first and third portions 310, 330 may pivot, either slidably or rotatably, around pivot axes 360. Other embodiments may include more or fewer portions and pivot axes, allowing for a higher degree of motion and change in total frontal area 380. This embodiment may also include hinges, biasing members, and/or active control as described herein.

Figure 8:
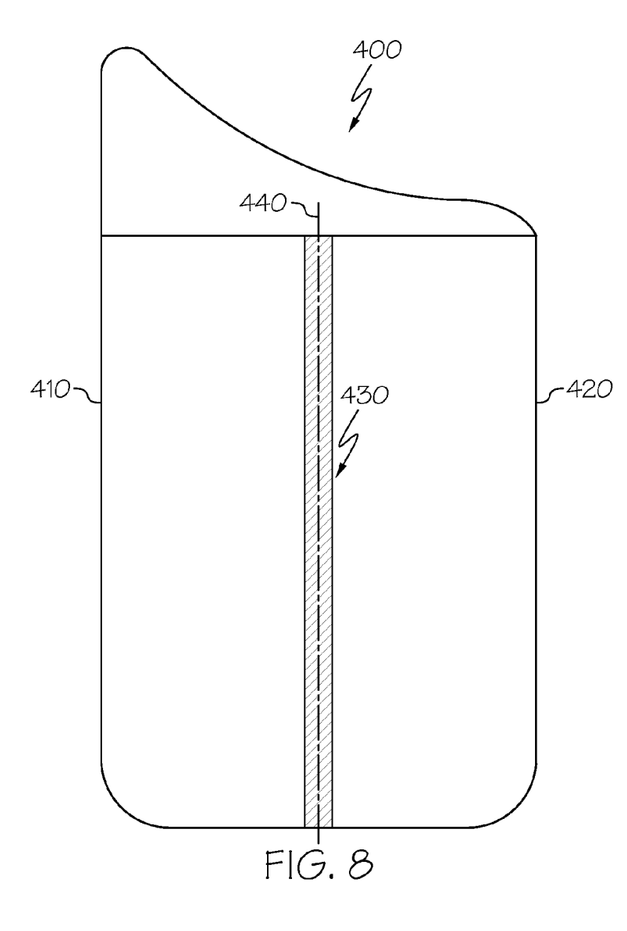
FIG. 8 schematically depicts a front view of a dynamic vehicle mudguard with a co-molded or living hinge, according to one or more embodiments shown and described herein.

Referring now to FIG. 8, one embodiment of a passive dynamic vehicle mudguard 400 with a hinge portion 430 is depicted in rear view. In this embodiment, a first portion 410 is separated from a second portion 420 by the hinge portion 430. The hinge portion 430 in this embodiment is a co-molded or living hinge. A co-molded hinge allows the first and second portions 410, 420 and the hinge portion 430 of the dynamic vehicle mudguard 400 to be constructed as a single piece. The hinge portion 430 may be formed of the same material as the first and/or second portions 410, 420, or in some embodiments, the hinge portion may be formed of a different material. For example, the first and second portions 410, 420 may be formed of high density polyethylene plastic, while the hinge portion 430 may be formed of low density polyethylene plastic. In another example, the first and second portions 410, 420 and the hinge portion 430 may be formed of the same material (e.g. high density polyethylene). Alternatively, or in addition to the material used for the hinge portion 430, the hinge portion 430 may also have different dimensions than the first or second portions 410, 420. For example, the first and second portions 410, 420 may have the same thickness while the hinge portion 430 in this embodiment has a greater thickness. Co-molded hinges may allow for increased efficiency in manufacturing the dynamic vehicle mudguard 400, as well as reduced complexity in the dynamic vehicle mudguard 400 apparatus, while maintaining similar functionality for the first and second portions 410, 420 described above.

In this embodiment, the material properties and dimensions of the co-molded hinge may affect the performance of the dynamic vehicle mudguard 400. For example, the spring and elastic properties of the material forming the co-molded hinge, as well as the thickness of the co-molded hinge, will affect the propensity for the first and/or second portions 410, 420 to pivot around pivot axis 440. If the material has low spring and high elastic properties, the first and/or second portions 410, 420 may pivot with little force applied to the frontal area. Likewise, if the material has high spring and low elastic properties, the first and/or second portions 410, 420 may not pivot until relatively greater force is applied to the frontal area.

Similarly, the hinge portion 430 may be a living hinge. The living hinge may be formed from the same material as the first and second portions 410, 420, but may have different dimensions. For example, the living hinge may be thinner than the first and second portions 410, 420. The living hinge may also be shorter than the first and second portions 410, 420 such that the living hinge does not extend all the way down the entire length of the dynamic vehicle mudguard 400.

Figure 9:
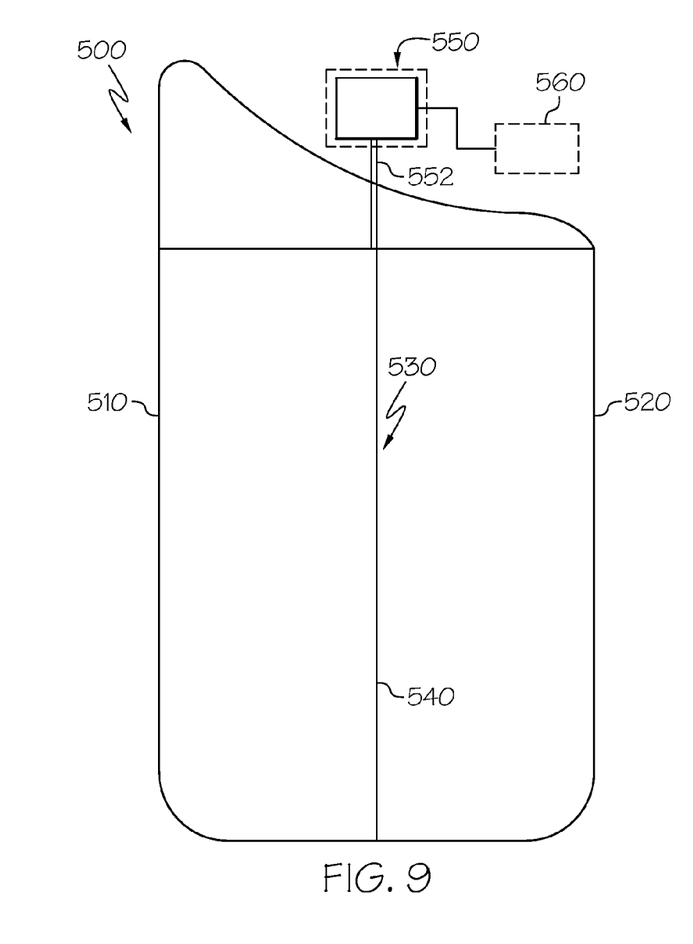
FIG. 9 schematically depicts a front view of a dynamic vehicle mudguard with active control, according to one or more embodiments shown and described herein.

Referring now to FIG. 9, one embodiment of a dynamic vehicle mudguard 500 with active control is depicted. The dynamic vehicle mudguard 500 includes a first portion 510, a second portion 520, a hinge portion 530, a pivot axis 540, an active control device 550, and an actuator 552. In this embodiment, the active control device 550 may be communicatively coupled to a processor 560 in the vehicle, such as an electronic control unit for the engine or transmission or a pressure sensor positioned on the first or second portion 510, 520, that may provide inputs to the active control device 550. One of the first or second portions 510, 520 may be fixed relative to the vehicle 10. The active control device 650 may include any actuator 552 operable to actuate the dynamic vehicle mudguard 600 from a default position to an aerodynamic position, including a motor such as a stepper motor or reciprocating motor, a solenoid, a mechanical actuator, and the like. In instances where a stepper motor is used, for example, the stepper motor shaft may form a central hinge pin. One side of the hinge may be attached to the shaft and may rotate around to fold the dynamic vehicle mudguard in half. The stepper motor may be concealed within the fender or wheel well. The active control device 650 may further include linkage to connect the motor or actuating portion to the dynamic vehicle mudguard 600 such as metal linkage or a flexible tether material.

The active control device 550 may receive signals and/or input from the processor 560 which may be on-board the vehicle. The processor 560, for example the engine or transmission electronic control unit, may send a signal to the active control device 550 when the vehicle 10 reaches a certain speed or shifts into a certain gear, and the active control device 550 may actuate the dynamic vehicle mudguard 500 from a default position to an aerodynamic position. In other embodiments, the active control device 550 may receive signals and/or input from a pressure sensor (not shown) positioned on the dynamic vehicle mudguard 500. The pressure sensor may detect air pressure against the first portion 510 and/or the second portion 520 of the dynamic vehicle mudguard 500. In some embodiments, the active control device 550 may receive signals and/or input from a force sensor (not shown) positioned on or near the dynamic vehicle mudguard 500. The force sensor may detect force incident on the first portion 510 and/or the second portion 520. The active control device 550 may actuate the dynamic vehicle mudguard 500 from the default position to the aerodynamic position based on received pressure or force signals.

The engine or transmission electronic control unit may continue to monitor the engine speed or transmission gear periodically or continually and may send another signal to the active control device 550 when the vehicle 10 is no longer at a sufficient speed or transmission gear, and the active control device 550 may actuate the dynamic vehicle mudguard 500 to the default position.

Similarly, in some embodiments, the active control device 550 may return the dynamic vehicle mudguard 500 to the default position from the aerodynamic position if the engine speed, transmission gear, air pressure, or force returns to a level less than the predetermined threshold. Some embodiments may use gravity or biasing members or other passive control to return to the default position, while some embodiments may incorporate active control to return to the default position. Other embodiments discussed herein as passive dynamic vehicle mudguards may accordingly be modified to include the active control devices discussed herein.

Figure 10:
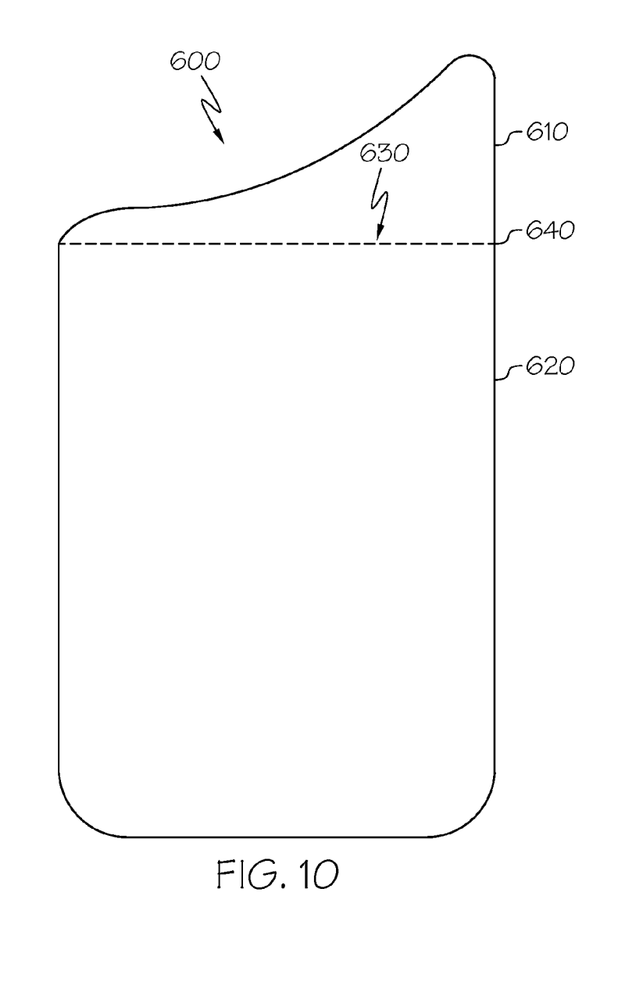
FIG. 10 schematically depicts a front view of a dynamic vehicle mudguard with a horizontal pivot axis, according to one or more embodiments shown and described herein.
Figure 11:
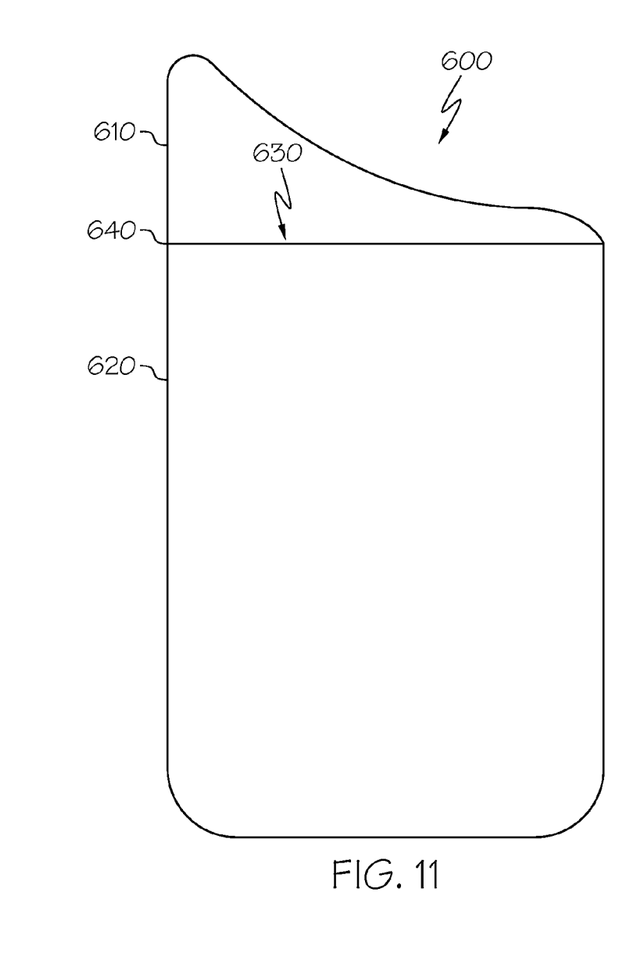
FIG. 11 schematically depicts a rear view of a dynamic vehicle mudguard with a horizontal pivot axis, according to one or more embodiments shown and described herein.

Referring now to FIGS. 10 and 11, another active control embodiment of a dynamic vehicle mudguard 600 is depicted. FIG. 10 depicts a front view and FIG. 11 depicts a rear view of the dynamic vehicle mudguard 600. In this embodiment, the dynamic vehicle mudguard 600 includes a first portion 610, a second portion 620, a hinge portion 630, and a pivot axis 640. In this embodiment the pivot axis 640 is horizontal. While depicted as being positioned at the intersection of the triangular first portion 610 and the second portion 620, the pivot axis 640 may be positioned anywhere along the dynamic vehicle mudguard 600 and may accordingly divide the dynamic vehicle mudguard 600 into first and second portions 610, 620. The first portion 610 is fixed relative to the vehicle 10 and does not pivot around the pivot axis 640. The second portion 620 pivots around the pivot axis 640. The second portion 620 pivots around the pivot axis 640 such that the second portion 620 rotates towards the rear section 20 of the vehicle 10, and further towards an under chassis of the vehicle 10. In another embodiment, the second portion 620 may slide up with respect to the first portion 610. In other embodiments, the dynamic vehicle mudguard 600 may further include a biasing member as discussed herein.

Figure 12:
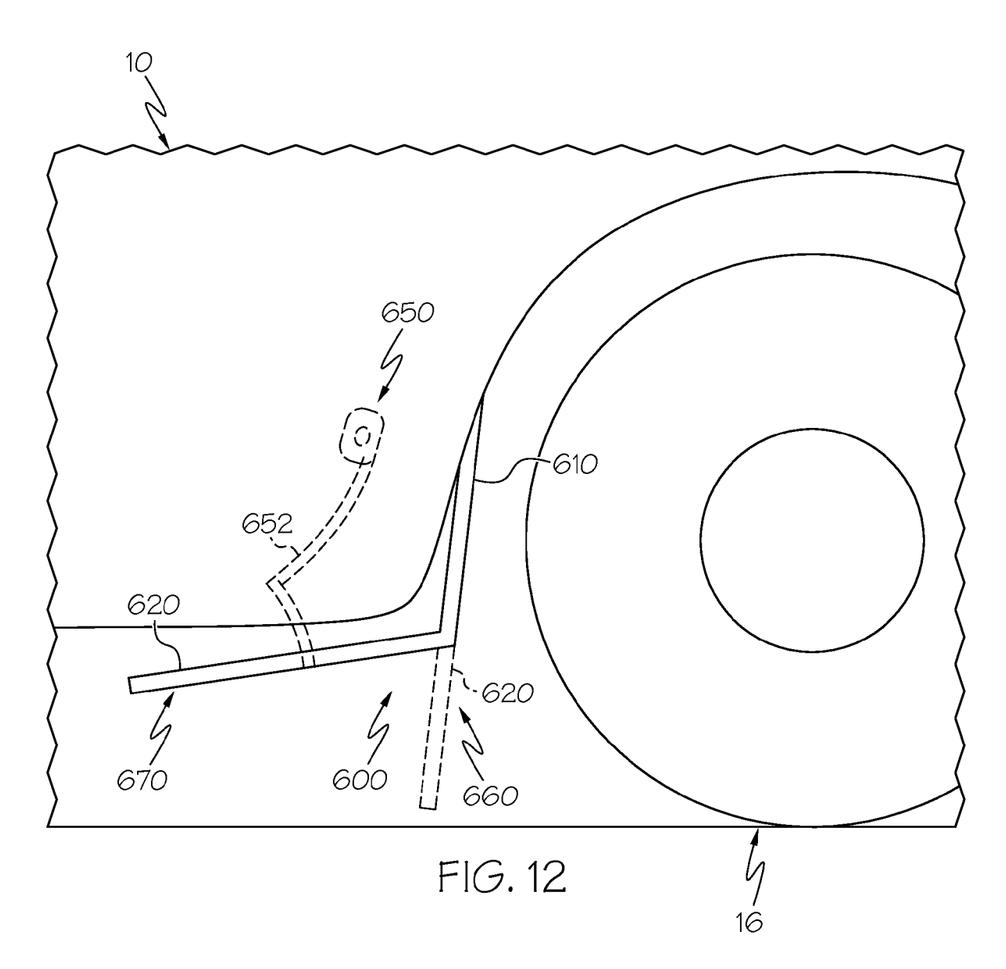
FIG. 12 schematically depicts the dynamic vehicle mudguard of FIG. 11 with active control, according to one or more embodiments shown and described herein.

Referring now to FIG. 12, the dynamic vehicle mudguard 600 is shown with the vehicle 10 and an active control device 650. In default position 660, the dynamic vehicle mudguard 600 is positioned behind the rear wheel 16. Upon reaching a certain vehicle speed, for example, the active control device 650 actuates linkage 652, pulling the second portion 620 up and rotating the second portion 620 towards the undercarriage of the vehicle 10 to aerodynamic position 670. When the vehicle speed falls below the predetermined threshold or when the transmission electronic control unit sends a retraction signal to the active control device 650, the active control device 650 may return the dynamic vehicle mudguard 600 to the default position 660. In embodiments without active control device 650, the second portion 620 may return to the default position 660 due to gravity or a biasing member, if included.

Figure 13:
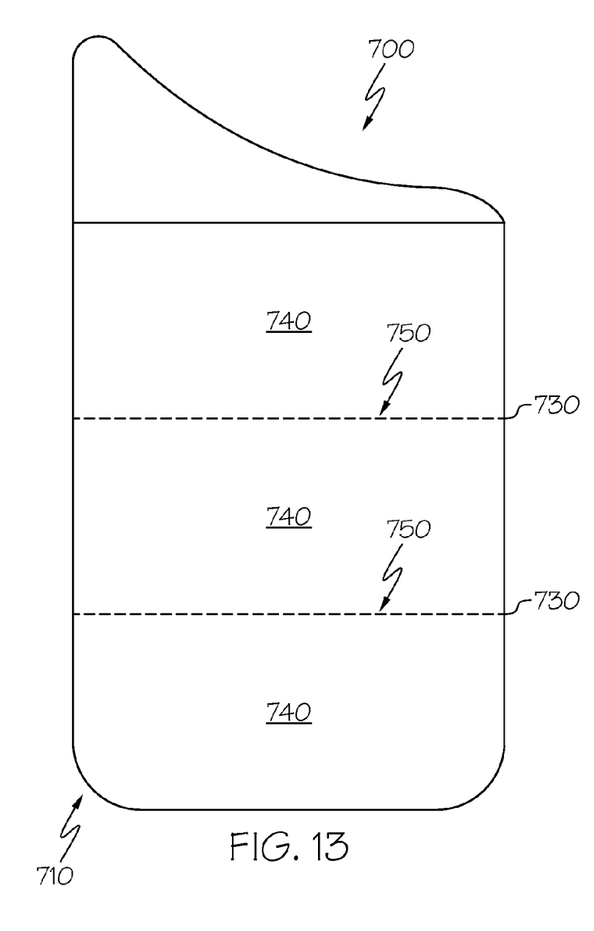
FIG. 13 schematically depicts a dynamic vehicle mudguard with multiple horizontal pivot axes, according to one or more embodiments shown and described herein.
Figure 14:
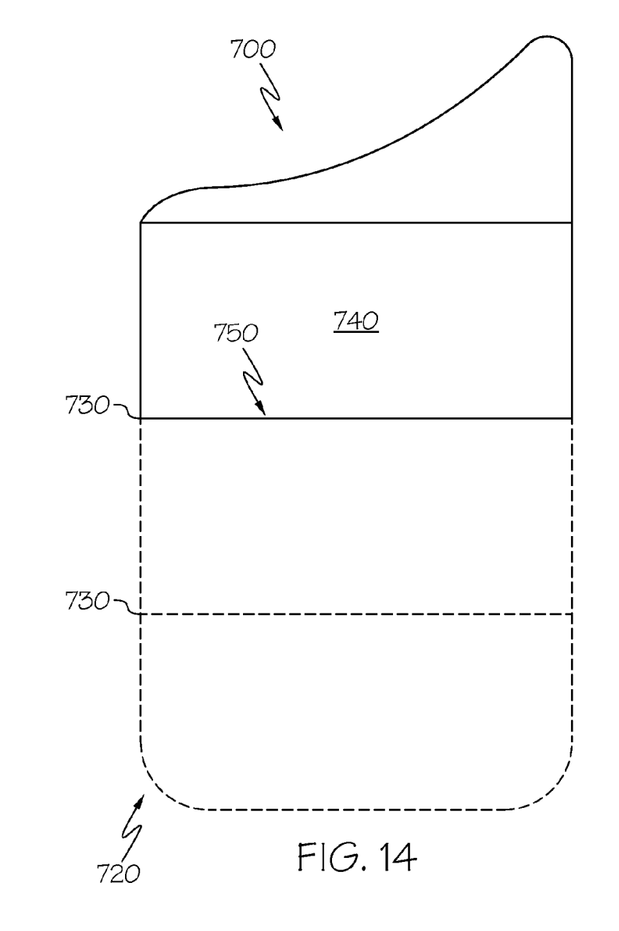
FIG. 14 schematically depicts the dynamic vehicle mudguard of FIG. 13 in an aerodynamic position, according to one or more embodiments shown and described herein.

Referring now to FIGS. 13 and 14, another passive embodiment of a dynamic vehicle mudguard 700 is depicted in a default position 710 and in an aerodynamic position 720. This embodiment of the dynamic vehicle mudguard 700 includes multiple horizontal pivot axes 730. The dynamic vehicle mudguard 700 may include several portions 740 that may be connected or hinged together at hinge portions 750. While three portions 740 are shown, additional or fewer portions may be included. In this embodiment, some portions 740 may be made of the same or different materials based on the location of the portion within the dynamic vehicle mudguard 700. For example, portions nearer a lower region of the dynamic vehicle mudguard 700 may be made of resilient or lightweight material, while portions near upper regions may be constructed of heavier or more rigid materials. This may allow the dynamic vehicle mudguard 700 to pivot to a semi-aerodynamic position in which only one of the portions is moved relative to the other portions at a lower force. When the force on the dynamic vehicle mudguard 700 increases, additional portions may pivot until the dynamic vehicle mudguard 700 is in the complete aerodynamic position 720, which may be as shown in FIG. 14. Gravity may serve as the acting force to return the dynamic vehicle mudguard 700 to the default position 710 when the vehicle 10 is no longer moving at a sufficient speed.

One method of actively controlling a dynamic vehicle mudguard attached to a vehicle includes monitoring a vehicle condition of the vehicle and determining whether the vehicle condition exceeds a predetermined threshold. The method further includes transitioning the dynamic vehicle mudguard from a default position to an aerodynamic position based on the vehicle condition, and transitioning the dynamic vehicle mudguard from the aerodynamic position to the default position when the vehicle condition is below the predetermined threshold.

It should now be understood that the dynamic vehicle mudguards described herein may result in reduced aerodynamic drag on the frontal area of the dynamic vehicle mudguard, and therefore reduced overall aerodynamic drag on vehicles equipped with the dynamic vehicle mudguard when the dynamic vehicle mudguard is in the aerodynamic position when vehicle is in motion. Furthermore, it should be understood that reduced aerodynamic drag may result in more efficient vehicle performance, enhanced fuel economy, and/or improved emissions performance. Finally, reducing the frontal area of the dynamic vehicle mudguard by moving to an aerodynamic position only when a predetermined amount of force is applied to the front face of the dynamic vehicle mudguard provides standard mudguard protection when the dynamic vehicle mudguard is in the default position.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A dynamic vehicle mudguard for attachment to a vehicle, the dynamic vehicle mudguard comprising a first portion, a second portion, and a hinge portion, wherein:
   the hinge portion is coupled to the first portion; and
   the second portion is coupled to the hinge portion and separated from the first portion, wherein when the dynamic vehicle mudguard is installed on the vehicle, the second portion is pivotable relative to the first portion about a pivot axis from a default position to an aerodynamic position, wherein the pivot axis extends vertically, wherein the first portion and the second portion are substantially coplanar in the default position.

2. The dynamic vehicle mudguard of claim 1, wherein the hinge portion biases the second portion to the default position.

3. The dynamic vehicle mudguard of claim 1, further comprising a biasing member biasing the second portion to the default position.

4. The dynamic vehicle mudguard of claim 1, wherein the hinge portion is one of a mechanical hinge, a living hinge, or a co-molded hinge.

5. The dynamic vehicle mudguard of claim 1, wherein the first portion and the second portion are not coplanar with each other in the aerodynamic position.

6. A vehicle comprising a dynamic vehicle mudguard, the dynamic vehicle mudguard comprising:
- a first portion, a second portion, a hinge portion, and a spring wherein:
  - the hinge portion is coupled to the first portion;
  - the second portion is coupled to the hinge portion and separated from the first portion;
  - the second portion is pivotable with respect to the first portion from a default position to an aerodynamic position around a pivot axis, wherein the pivot axis extends vertically and the dynamic vehicle mudguard is attached to the vehicle such that the dynamic vehicle mudguard is positioned adjacent to a vehicle wheel; and
  - the spring biases the second portion to the default position.

7. The vehicle of claim 6, wherein the hinge portion biases the second portion to the default position.

8. The vehicle of claim 6, wherein the hinge portion is one of a mechanical hinge, a living hinge, or a co-molded hinge.

9. The vehicle of claim 6, wherein the first portion and the second portion are substantially coplanar with each other in the default position.

10. The vehicle of claim 6, wherein the first portion and the second portion are not coplanar with each other in the aerodynamic position.

11. The vehicle of claim 6, further comprising an active control device that pivots the second portion from the default position to the aerodynamic position.

12. The vehicle of claim 11, wherein the active control device pivots the second portion from the default position to the aerodynamic position based on a vehicle speed.

13. A vehicle comprising a dynamic vehicle mudguard, the dynamic vehicle mudguard comprising a first portion, a second portion, and a hinge portion, wherein:
- the hinge portion is coupled to the first portion;
- the second portion is coupled to the hinge portion and separated from the first portion;
- the second portion is pivotable relative to the first portion about a pivot axis from a default position to an aerodynamic position; and
- the first portion is fixed relative to the vehicle in the default position and in the aerodynamic position, wherein the first portion and the second portion are substantially coplanar in the default position and not coplanar in the aerodynamic position.

14. The vehicle of claim 13, further comprising an active control device that pivots the second portion from the default position to the aerodynamic position.

15. The vehicle of claim 13, wherein the pivot axis extends horizontally.

16. The vehicle of claim 13, wherein the pivot axis extends vertically.

* * * * *